United States Patent [19]
Kiel et al.

[11] 3,912,782
[45] Oct. 14, 1975

[54] CATALYTIC PROCESS FOR PREPARING 3-HALOGEN- AND 3,5-DIHALOGEN-PHENOLS

[75] Inventors: Wolfgang Kiel, Schildgen; Karlfried Wedemeyer, Cologne; Werner Evertz, Monheim, all of Germany

[73] Assignee: Bayer Aktiengesellschaft, Leverkusen, Germany

[22] Filed: Nov. 28, 1973

[21] Appl. No.: 419,853

[30] Foreign Application Priority Data
Sept. 6, 1973 Germany.............................. 2344926

[52] U.S. Cl. ............. 260/620; 252/439; 260/340.7; 260/570.9; 260/609 R; 260/612 R; 260/612 D; 260/613 R; 260/613 D; 260/619 R; 260/619 A; 260/621 R; 260/623 R
[51] Int. Cl.[2] C07C 39/24; C07C 39/28; C07C 39/29
[58] Field of Search.......... 260/340.7, 570.9, 609 R, 260/612 R, 612 D, 613 R, 613 D, 619 A, 619 R, 620, 621 R, 623 R; 252/439

[56] References Cited
OTHER PUBLICATIONS
Freifelder, "Practical Catalytic Hydrogenation," pp. 3, 4, 15, 35–39, 74, 75, 78–82, 451, 452, 473–476, 550–552, 554, 556, and 645–647, (1971).
Weygand, "Preparative Organic Chem.," pp. 66, 1972.
Bornstein et al., "Chem. and Indust.", Vol. 1958, pp. 441–442, (1958).

*Primary Examiner*—Norman P. Morgenstern
*Attorney, Agent, or Firm*—Burgess, Dinklage & Sprung

[57] ABSTRACT 3-halogen- and 3,5-dihalogen-phenols are prepared from higher-halogenated compounds having the formula

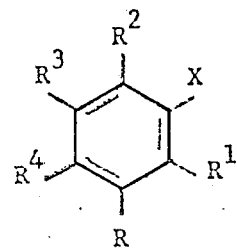

wherein
X represents halogen,
$R^1$, $R^2$, $R^3$ and $R^4$ independently of one another represent hydrogen, halogen an alkyl, aralkyl, aryl, alkoxy, aryloxy, alkyl mercapto or dialkylaminomethyl radical,
in addition to which at least one of the radicals $R^1$, $R^2$ or $R^4$ represents a halogen atom, whilst the radical $R^3$ can also represent a hydroxy group and, in the case of 3,5-dihalogenphenols, exclusively represents a halogen atom,
R represents OH,
in addition to which R together with $R^1$ can represent the radical — O— $CH_2$ — O —$CH_2$, the phenol oxygen atom standing for R, in which case X, $R^2$, $R^3$ and $R^4$ independently of one another represent hydrogen, halogen or an alkyl radical and at least one of the radicals X or $R^3$ and at least one of the radicals $R^2$ or $R^4$ represents a halogen atom.

9 Claims, No Drawings

CATALYTIC PROCESS FOR PREPARING 3-HALOGEN- AND 3,5-DIHALOGEN-PHENOLS

BACKGROUND

This invention relates to a process for the production of 3-halogen-phenols and 3,5-dihalogen-phenols by the partial, selective dehalogenation of higher-halogenated phenols using catalytic hydrogenation, and to the catalysts used for this process.

Conventional methods of producing 3-halogen- and 3,5-dihalogen-phenols are complicated and are expensive in terms of both labor and costs to carry out in practice. Thus, in processes based on the halogenation of a nitrobenzene, the resulting 3-halogen-1-nitrobenzene has to be catalytically reduced into the corresponding aniline, followed by diazotisation and boiling to form the 3-halogen-phenol (cf. Beilsteins Handbuch der organischen Chemie, 4th Edition, Vol. VI, page 185).

In the alkaline hydrolysis of suitable dihalogen and trihalogen benzenes to form the corresponding 3-halogen- and 3,5-dihalogen-phenols, the dihalogen and trihalogen benzenes used as starting materials have to be used in a purity which is extremely difficult to obtain (cf. Chemischer Informationsdienst, 1971, B-24-232).

Furthermore, it is already known that individual halogenated phenols can be subjected to catalytic hydrogenation. Hydrogenation catalysts, for example, Raney nickel (cf. Houben-weyl, Methoden der Organischen Chemie, 4th Edition, Vol. V/4, page 772) or palladium (Indian J. Chem. 2, 294 (1964), Vol. 86, 501 (1953), are used for this purpose.

However, a selective, partial dehalogenation is unknown in the catalytic hydrogenation of polychlorophenols.

For example, the hydrogenation of pentachlorophenol with Raney nickel results in the formation of phenol through complete dehalogenation (Bull. 1963, No. 11, page 2442).

The hydrogenation of polychlorophenols in the gas phase on activated alumina impregnated with copper (I) chloride to form phenol mixtures of different chlorine content (DAS 1,109,701) is neither complete nor specific.

SUMMARY

Surprisingly, it has now been found that 3-halogen- and 3,5-dihalogen-phenols can be selectively obtained without difficulty from higher-halogenated compounds by reacting a halogen compound corresponding to the general formula

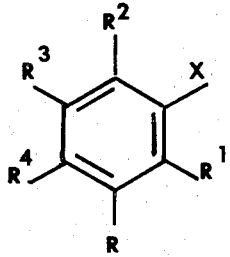

in which
X represents halogen;
$R^1$, $R^2$, $R^3$ and $R^4$ independently of one another represent hydrogen, halogen, an alkyl, aralkyl, aryl, alkoxy, aryloxy, alkylmercapto or dialkylamino methyl radical; or at least one of the radicals $R^1$, $R^2$ or $R^4$ represents a halogen atom whilst the radical $R^3$ can also represent a hydroxy group and, in the case of 3,5-dihalogen-phenols, exclusively represents a halogen atom;
R represents OH, or R together with $R^1$ can represent the radical

the phenol oxygen atom standing for R, in which case X, $R^2$, $R^3$ and $R^4$ independently of one another represent hydrogen, halogen or an alkyl radical and at least one of the radicals X or $R^3$ and at least one of the radicals $R^2$ or $R^4$ represents a halogen atom, with hydrogen at an elevated temperature and pressure in the presence of a sulphide or polysulphide of one or more of the metals Fe, Co, Ni, optionally applied to a support, or of a mixture of these metal sulphides or polysulphides as catalyst.

DESCRIPTION

The halogen atoms represented by the radicals X and $R^1$ to $R^4$ may be fluorine, chlorine, bromine, iodine, preferably chlorine and bromine.

Alkyl radicals $R^1$ to $R^4$ are linear or branched alkyl radicals having up to 12 carbon atoms and preferably with up to 6 carbon atoms, also cycloalkyl radicals, preferably those having 5 or 6 carbon atoms in the ring. The methyl, ethyl, propyl, isopropyl and tert.-butyl radicals are mentioned as specific examples.

The benzyl radical and substituted benzyl radicals represent preferred aralkyl radicals $R^1$ to $R^4$.

Suitable substituents for the arylalkyl radicals $R^1$ to $R^4$ substituted in the aryl nucleus include halogen (fluorine, chlorine, bromine or iodine), preferably chlorine and bromine; the hydroxy group; linear or branched alkyl radicals having up to 12 carbon atoms and preferably having up to 6 carbon atoms; cycloalkyl radicals, preferably with 5 or 6 carbon atoms in the ring; and aryl radicals, especially the phenyl radical.

The phenyl radical and substituted phenyl radicals represent preferred aryl radicals $R^1$ to $R^4$.

Substituents for the aryl radicals $R^1$ to $R^4$ include halogen (fluorine, chlorine, bromine or iodine), preferably chlorine and bromine; the hydroxy group; linear or branched alkyl radicals having up to 12 carbon atoms and preferably having up to 6 carbon atoms; cycloalkyl radicals, preferably with 5 or 6 carbon atoms in the ring; and aryl radicals, especially the phenyl radical.

Alkoxy- and alkyl-mercapto radicals $R^1$ to $R^4$ are linear or branched radicals having up to 12 carbon atoms and preferably having up to 6 carbon atoms, also cycloalkyl radicals, preferably those with 5 or 6 carbon atoms in the ring.

The phenoxy radical and substituted phenoxy radicals represent preferred aryloxy radicals.

Substituents for the the aryloxy radicals $R^1$ to $R^4$ include halogen (fluorine, chlorine, bromine or iodine), preferably chlorine and bromine, the hydroxy group, linear or branched alkyl radicals having up to 12 carbon atoms and preferably having up to 6 carbon atoms, cycloalkyl radicals, preferably with 5 or 6 carbon atoms in the ring, aryl radicals, especially the phenyl radical.

Dialkylaminomethyl radicals $R^1$ to $R^4$ are radicals with linear or branched alkyl groups containing up to 12 carbon atoms and preferably up to 6 carbon atoms, also cycloalkyl radicals, preferably those containing 5 or 6 carbon atoms in the ring. Alternatively the two alkyl groups can also form a common part of a ring.

In the hydrogenation of polyhalogen phenols with dialkylamino methyl radicals, dialkylamine is split off in addition to the partial and selective dehalogenation. It is possible in this way to obtain the corresponding methyl-m-halogen phenols.

The compounds corresponding to the above general formula are known and are readily obtainable. The following are mentioned as examples of compounds which can be used for the process according to the invention: 2,3-, 2,5-, 3,4-dihalogenphenols; 2,3,4-, 2,3,6-, 2,4,5-, 2,3,5- and 3,4,5-trihalogenphenols; 2,3,4,6-, 2,3,4,5-, 2,3,5,6-tetrahalogen phenols, petanchlorophenol, 2-bromo-3-chlorophenol, 3-bromo-4-chlorophenol, 3-bromo-2-chlorophenol, 2-bromo-5-chlorophenol, 5-bromo-2-chlorophenol, 4-bromo-3-chlorophenol, 4-bromo-2,5-dichlorophenol, 4-chloro-2,3,6-tribromophenol, 4,5,6-trichloro-o-cresol, 5,6-dichloro-o-cresol, 2,4,5,6-tetrachloro-m-cresol, 2,4,5,6-tetrabromo-m-cresol, 2,5-dibromo-p-cresol, 2,5-dichloro-p-cresol, 2,3,5,6-tetrachloro-p-cresol, 6-chloro-2,5-dibromo-p-cresol, 2,3,6-tribormo-p-cresol, 2,3,5,6-tetrabromo-p-cresol, 2,5-dichloro-[3,4]-xylenol, 2,5,6-tribromo-[3,4]-xylenol, 4-chloro-3-bromo-[2,6]-xylenol, 3,4-dibromo-[2,6]-xylenol, 3,5-dibromo-4-chloro-[2,6]-xylenol, 3,4,5-tribromo-[2,6]-xylenol, 3,4,6-tribromo-[2,5]-xylenol, 2,5-dichloro-4-ethylphenol, 2,5-dichloro-4-propylphenol, 2,5-dichloro-4-tert.-butylphenol, tetrachloro resorcinol, 2,4,6-trichloro-2-benzylphenol, 2,2'-dihydroxy-3,5,6,3',5',6'-hexachloro-diphenylmethane, 3,4,5-trichloro-2-hydroxy-diphenyl, 4,4'-dihydroxy octachlorodiphenyl, 3,4-dichloro-guaiacol, 3,6-dichloroguaiacol, 4,5-dichloro guaiacol, 5,6-dichloro-guaiacol, 3,4,6-trichloroguaiacol, 3,4,5-trichloro-guaiacol, 3,4,5,6-tetrachloroguaiacol, 4,5-dichloro-3-methoxyphenol, 5,6-dichloro-3-methoxyphenol, 2,5-dichloro-3-methoxyphenol, 4,5,6-trichloro-3-methoxyphenol, 2,4,5,6-tetrachloro-3-methoxyphenol, 2,3-dichloro-4-methoxyphenol, 2,5-dichloro-4-methoxyphenol, 2,3,6-trichloro-4-methoxyphenol, 2,3,5-trichloro-4-methoxyphenol, 2,3,5,6-tetrachloro-4-methoxyphenol, 4,5-dichloro-2-phenoxyphenol, 3,4,5,6-tetrachloro-2-phenoxy phenol, 2,4,5,6-tetrachloro-3-phenoxyphenol, 2,5-dichloro-4-phenoxyphenol, 2,3,5,6-tetrachloro-4-phenoxyphenol, 2,5-dichloro-4-methylmercaptophenol, 2,4,5,6-tetrachloro-4-methylmercaptophenol, 2-(dimethylamino-methyl)-3,6-dichlorophenol, 4-(dimethylamino methyl)-2,5-dichlorophenol, 2-(dimethylamino-methyl)-3,4,6-trichlorophenol, 2,4-bis-(dimethylamino-methyl)-3,6-dichlorophenol, 2,4-bis-(dipiperidyl-amino-methyl)-3,6-dichlorophenol, 5,6-dichloro-1,3-benzodioxan, 5,8-dichloro-1,3-benzodioxan, 5,7,8-trichloro-1,3-benzodioxan, 5,6-dichloro-8-methyl benzodioxan and 5,8-dichloro-6-methyl-benzodioxan.

The catalysts which can be used for the process according to the invention consist of the metals Fe, Co, Ni in the form of their sulphides and polysulphides.

The catalysts according to the invention can of course also be applied to supporting materials. Any supporting materials known per se can be used for this purpose, providing they are inert with respect to bases and water. Examples of suitable supporting materials include $BaSo_4$, $Ca_3(PO_4)_2$ and carbon. Active carbon is preferably used as the supporting material.

The catalysts according to the invention can be prepared in different ways:

Generally, there is no need for the sulphides or polysulphides of iron, cobalt or nickel to be separately prepared. Water soluble salts or iron, cobalt or nickel, for example the halides, nitrates, sulphates, also sulphide or polysulphide ions, for example in the form of hydrogen sulphide or a water-soluble sulphide or polysulphide can be individually added to the reaction mixture at the beginning of the reaction.

However, it can also be advantageous, for example in cases where aprotic solvents such as toluene and benzene are used, to prepare the iron, cobalt or nickel sulphide or polysulphide catalyst in a separate process. To this end, the water-soluble salts of iron, cobalt or nickel, for example the halides, nitrates, sulphates, are precipitated by the addition of sulphide or polysulphide ions, for example by introducing hydrogen sulphide or by adding a water-soluble sulphide or polysulphide in aqueous solution. They may even be precipitated on to a support. If necessary, the catalyst subsequently filtered off can even be dried before it is used in an aprotic solvent.

This method of preparation can generally be carried out with any water-soluble salts of iron, cobalt and nickel, for example halides, nitrates, sulphates, salts or organic acids such as oxalates or acetates. However, it is preferred to use readily accessible salts such as chlorides, nitrates and sulphates.

The catalysts according to the invention retain their activity over prolonged periods, even when they are repeatedly used in the process according to the invention and even when the process according to the invention is carried out continuously.

The quantity in which the catalyst according to the invention is used is by no means a critical parameter in the process according to the invention. It can be varied within wide limits. In general, the catalyst is used in a quantity of from 0.5 to 20 % by weight and preferably in a quantity of from 1 to 10 % by weight, based on the starting material. In cases where it is applied to a support, the catalyst is used in a correspondingly larger quantity, generally amounting to from about 5 to 30 % by weight and preferably to from 10 to 20 % by weight, based on the starting material used.

The process according to the invention is generally carried out at a temperature of from about 100° to about 350°C and preferably at temperatures of from about 180° to 330°C. On account of the vapour pressure of the compounds to be hydrogenated and the solvent used, if any, at these temperatures, it is best to work at elevated pressure. In general, the process is carried out under a hydrogen pressure of from about 20 to 250 atms., preferably under a hydrogen pressure of from 40 to 220 atms. and more particularly under a hydrogen pressure of from 50 to 200 atms.

The reaction time is generally governed by the reaction temperature to the extent that, with increased reaction temperature and velocity, a shorter reaction time is required for the same conversion. On account of this dependency, it is generally not possible to state the reaction time, although, even if the necessary reaction time is exceeded, there is no danger of undesirable dehalogenation into the hydroxy group of halogen atoms in the m-position.

In general, the process according to the invention is carried out in solvent. It is possible for this purpose to use any solvents that are inert under the reaction conditions, preferably water, monohydric and polyhydric alcohols, mixtures of the aforementioned solvents, also benzene and toluene and mixtures thereof.

The process according to the invention is illustrated by the following reaction equation for the dehalogenation of 2,4,5-trichlorophenol into 3-chlorophenol:

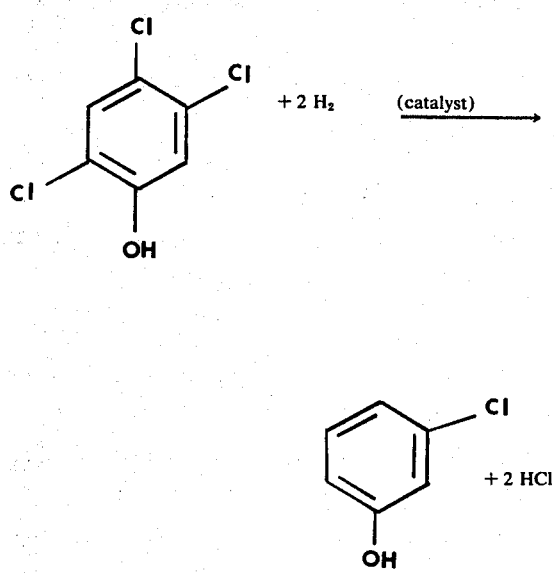

Since hydrogen halide is evolved during the reaction according to the invention, it is generally best to add a base as hydrogen halide acceptor to the starting mixture before the beginning of the reaction. The bases normally used as hydrogen halide acceptors can be employed for this purpose. It is preferred to use tertiary amines, anilines and pyridine, also the hydroxides, carbonates, bicarbonates and acetates of the alkali metals, especially sodium and potassium, and of the alkaline earth metals, especially calcium hydroxide. The quantity in which the base is used is generally selected so that one equivalent of base is used per halogen atom of the starting compound which is not in the 3- or 5-position to the hydroxy group. However, it is also possible to use an excess of base over and above this ratio.

In general, the process is carried out by introducing the starting material, solvent and hydrogen halide acceptor into an autoclave, adding the catalyst and, after the autoclave has been closed, flushing out the air present in it with nitrogen. The nitrogen is then flushed out with hydrogen, the autoclave placed under the hydrogen pressure selected and the reaction carried out at the temperature selected. On completion of the reaction, the 3-halogen- or 3,5-dihalogenphenol is dissolved or kept in solution as phenolate by the addition of alkali hydroxide and the catalyst separated off, for example by filtration. The catalyst-free solution is worked up by the methods known per se, for example by acidification with a mineral acid, for example concentrated hydrochloric acid, extracting the 3-halogen- or 3,5-dihalogen-phenol by shaking with an organic solvent, for example methylene chloride, and subsequently working up the organic phase, for example by fractional distillation.

The process according to the invention can be carried out both in batches and continuously. It can be particularly advantageous to carry out the process according to the invention continuously. The layout required for this purpose in terms of apparatus to enable the process to be carried out as a fixed-bed or fluidised-bed catalyst process, is known per se from the prior art, as is the continuous introduction of the starting and auxially materials required and the continuous isolation of the reaction product from the reaction mixture (cf. for example German Pat. No. 948,784).

The surprising advantage of the process according to the invention is that it enables corresponding higher-halogenated phenols to be selectively dehalogenated into 3-halogen- and 3,5-dihalogen-phenol without difficulty by catalytic hydrogenation.

Another advantage of the process according to the invention is that it is also possible to use as starting material mixtures in which there is no halogen in the 3- or 5-position to the hydroxy group. In the process according to the invention, these compounds are dehalogenated into phenol which is readily separated off by distillation. By contrast, separation of the corresponding halogen phenols from the compounds corresponding to the above general formula in which R represents OH is both complicated and time-consuming (cf. for example DAS No. 1,543,367).

The 3-halogen- and 3,5-dihalogen-phenols which can be obtained by the process according to the invention correspond to the general formula:

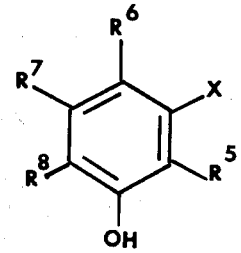

in which
X represents halogen,
$R^5$, $R^6$, $R^7$ and $R^8$ independently of one another represent hydrogen, an alkyl, aralkyl, aryl, alkoxy, aryloxy or alkyl mercapto radical, or at least one of the radicals $R^5$, $R^6$ and $R^8$ represents hydrogen whilst the radical $R^7$ can also represent a hydroxy group and, in the case of 3,5-dihalogen-phenols, exclusively represents a halogen atom.

The following are mentioned as examples of halogen-phenols which can be obtained as products of the process according to the invention. 3-bromophenol, 3-chlorophenol, 3,5-dichlorophenol, 5-chloro-o-cresol, 5-chloro-m-cresol, 3-bromo-p-cresol, 3-chloro-p-cresol, 3,5-dichloro-p-cresol, 3-bromo-p-cresol, 3,5-dibromo-p-cresol. 5-chloro-3,4-xylenol, 5-bromo-3,4-xylenol, 3-bromo-2,6-xylenol, 3,5-dibromo-2,6-xylenol, 3-bromo-2,5-xylenol, 3-chloro-4-ethylphenol, 3-chloro-4-propylphenol, 3-chloro-4-tert.-butylphenol, 5-chloro-resorcinol, 3-chloro-2-benzyl-phenol, 2,2'-dihydroxy-6,6'-dichlorodiphenyl-methane, 4-chloro-2-hydroxy diphenyl, 4,4'-dihydroxy-2,6,2',6'-tetrachlorodiphenyl, 3-chloro-guaiacol, 5-chloro-guaiacol, 3,5-dichloro-guaiacol, 5-chloro-3- methoxyphenol, 3-chloro-4-methoxyphenol, 3,5-dichloro-4-methoxyphenol, 3-chloro-2-phenoxyphenol, 5-chloro-2-phenoxyphenol, 3,5-dichloro-2-phenoxyphenol, 5-chloro-3-phenoxyphenol, 3-chloro-4-phenoxyphenol, 3,5-dichloro-4-phenoxyphenol, 3-chloro-4-methylmercaptophenol and 3,5-dichloro-4-methylmercaptophenol.

3-Halogen- and 3,5-dihalogen-phenols are known intermediate products and are used in particular in the production of herbicides, plant growth regulants and pharmaceutical agents (German Pat. Nos. 921,870, 1,116,656, 814,152; U.S. Pat. Nos. 2,957,760, 3,080,225; German Offenlegungsschriften 1,906,551, 2,229,062; British Pat. No. 1,251,695).

EXAMPLES

A. Preparations of the catalysts

Examples 1 to 5

10 g of active carbon were introduced into 200 ml of water. The quantity specified in Table I of an Fe, Co or Ni salt or of a mixture of these salts, dissolved in 30 ml of water, was initially run in with stirring. The metal sulphide or polysulphide was then precipitated by the dropwise addition of $Na_2S$ or $Na_2S_3$, dissolved in 30 ml of water, in the quantity specified in Table I. On completion of the addition, stirring was continued for another 30 minutes at 80°C. The catalyst was then filtered off under suction and washed with water until free from sulphide.

If the catalyst is intended to be used in aprotic solvents, it is dried for about 12 hours at 80°C/250 Torr.

Table I.

| Example No. | Catalyst of 10 g of active carbon and: |
|---|---|
| 1 | 4.2 g of $CoSO_4$ . 7 $H_2O$ <br> 2.1 g of $Na_2S$ . 3 $H_2O$ |
| 2 | 4.2 g of $CoSO_4$ . 7 $H_2O$ <br> $Na_2S_3$ from 2.1 g of $Na_2S$ . 3 $H_2O$ and 1 g of S |
| 3 | 25.2 g of $FeSO_4$ . 7 $H_2O$ <br> 12.0 g of $Na_2S$ . 3 $H_2O$ |
| 4 | 4.2 g of $CoSO_4$ . 7 $H_2O$ <br> 8.4 g of $FeSO_4$ . 7 $H_2O$ <br> 6.0 g of $Na_2S$ . 3 $H_2O$ |
| 5 | 11.6 g of $NiCl_2$ . 6 $H_2O$ <br> 12.0 g of $Na_2S$ . 3 $H_2O$ |

B. Process Examples

Example 6

81 g of 2,5-dichlorophenol (0.5 mol), 22 g of NaOH (0.55 mol) and 300 ml of water were introduced into a 0.7 liter capacity hydrogenation autoclave (equipped with a stirring mechanism). 10 g of the catalyst prepared in accordance with Example 1 were then added.

The autoclave was closed; the air displaced with nitrogen and the nitrogen subsequently flushed out with hydrogen. The contents of the autoclave were then heated to 250°C and hydrogenated for 60 minutes under a hydrogen pressure of 200 atms.

On completion of hydrogenation, 30 ml of concentrated sodium hydroxide (approximately 0.5 mol) were added to the reaction mixture. The reaction mixture was stirred briefly and vigorously and the catalyst filtered off under suction from the liquid reaction mixture. The catalyst was then washed with 300 to 400 ml of warm water (approximately 60° to 70°C).

The reaction solution which accumulated as filtrate was cooled and acidified at room temperature with 70 ml of concentrated hydrochloric acid (approximately 0.8 mol of HCl). The aqueous mixture was extracted by shaking with approximately 150 ml of methylene chloride in several portions. The organic phases which accumulated were combined and dried over $Na_2SO_4$.

The solvent (methylene chloride) was then distilled off and the liquid residue distilled at around 100°C/10 mm Hg. The yield comprised 96 % of the theoretical yield.

EXAMPLE 7

The procedure was as described in Example 6, except that the CoS/FeS catalyst prepared in accordance with Example 4 was used as catalyst. The yield amounted to 93 % of the theoretical yield.

Table II below shows the analyses of the crude products as determined by gas chromatography, and the yields derived therefrom:

Table II

| Example No. | Yield % of theoretical | Analysis | | | |
|---|---|---|---|---|---|
| | | % 3-CP | % 2,5-DCP | % P | % 2-CP |
| 6 | 96 | 97.18 | — | 2.40 | 0.07 |
| 7 | 93 | 97.78 | — | 2.21 | — |

The abbreviations used for the results of analysis in Table II above and in the following Tables have the following meanings:

| P | = | phenol |
| 3-CP | = | 3-chlorophenol |
| 2-CP | = | 2-chlorophenol |
| 2,5-DCP | = | 2,5-dichlorophenol |
| 2,4-DCP | = | 2,4-dichlorophenol |
| 3,4-DCP | = | 3,4-dichlorophenol |
| 3,5-DCP | = | 3,5-dichlorophenol |

EXAMPLES 8 to 11

Following the procedure of Example 6, 81 g of a dichlorophenol mixture (74.4 % of 2,5-dichlorophenol, 9.1 % of 3,4-dichlorophenol, 14.9 % of 2,4-dichlorophenol), 22 g of NaOH and 300 ml of water were hydrogenated under a hydrogen pressure of 200 atms. over the periods and at the temperatures specified in the following Table. Working up was carried out in the same way as described in Example 6. Table III below shows the analysis of the crude products, as determined by gas chromatography, and the yields derived therefrom.

Table III

| Example No. | Catalyst according to Example No. | Time mins. | Temp. °C. | Yield % of theoretical | Analysis | | |
|---|---|---|---|---|---|---|---|
| | | | | | %3-Cl | %2,5-DCP | %P |
| 8 | 1 | 45 | 280 | 82.5 | 85.27 | 0.08 | 13.89 |
| 9 | 2 | 45 | 280 | 83.5 | 88.07 | 0.03 | 11.44 |
| 10 | 3 | 45 | 300 | 66.0 | 84.36 | — | 15.63 |
| 11 | 4 | 45 | 280 | 82.5 | 80.05 | 0.54 | 13.60 |

EXAMPLE 12

Following the procedure of Example 6, 133 g (0.5 mol) of pentachlorophenol are hydrogenated in a solution of 105 g (1 mol) of Na₂CO₃ in 220 ml of water over a period of 25 minutes at 260°C/150 atms. hydrogen pressure using the catalyst prepared in accordance with Example 4. Working up was carried out as described in Example 6.

Analysis of the crude product as determined by gas chromatography and the yield derived therefrom are shown in Table IV below:

Table IV

| Example No. | Catalyst of Example No. | Yield % of theoretical | Analysis |  |  |  |
|---|---|---|---|---|---|---|
|  |  |  | % 3,5-DCP | %3-CP | %4-CP | %2,4-DCP |
| 12 | 4 | 80.5 | 84.89 | 3.92 | 5.63 | 2.61 |

EXAMPLE 13

Following the procedure of Example 6, 40 g of tetrachloro-p-cresol, 26 g of NaHCO₃ in 250 ml of water ware hydrogenated for 90 minutes at 200°C under a hydrogen pressure of 200 atms. A CoS/FeS catalyst according to Example 4 was used as the catalyst.

Working up was carried out as described in Example 6, giving 29 g of a crude product of which 79 % consists of 3,5-dichloro-p-cresol, corresponding to a yield of 68 % of the theoretical. Melting point 97° to 98°C (recrystallised from ligroin).

EXAMPLE 14

Following the procedure of Example 6, 25 g of tetrachloro-o-cresol, 14.5 g of soda, 10 g of the CoS catalyst according to Example 1 and 100 ml of water were hydrogenated for 45 minutes at 230°C under a hydrogen pressure of 200 atms. Working up was carried out in the same way as described in Example 6, giving 15.5 g of a crude product of which 77 % consisted of 3,5-dichloro-o-cresol, corresponding to a yield of 67 % of the theoretical yield. Melting point: 87 to 89°C (recrystallised from ligroin).

EXAMPLE 15

Following the procedure of Example 6, 20 g of 2,3,6-trichloro-4-tert.-butylphenol, 4 g of NaOH and 5 g of Na₂CO₃ in 150 ml of water were hydrogenated for 60 minutes at 240°C/200 atms. hydrogen pressure using 10 g of the CoS catalyst produced in accordance with Example 1. Working up is carried out in the same way as described in Example 6, giving 13.5 g of a crude product of which 85 % consisted of 3-chloro-4-tert.-butylphenol, corresponding to a yield of 79 % of the theoretical yield. Melting point: 65° to 66°C (recrystallised from petroleum ether).

EXAMPLE 16

Following the procedure of Example 6, 20 g of tetra-chloro-p-methoxyphenol, 13 g of NaHCO₃, 10 g of the CoS/FeS catalyst according to Example 4 and 240 ml of water were hydrogenated for 60 minutes at 200°C under a hydrogen pressure of 200 atms. Working up was carried out in the same way as described in Example 6, giving 15 g of a crude product of which 92.12 % consisted of 3,5-dichloro-4-methoxy phenol, corresponding to a yield of 94 % of the theoretical yield. Melting point: 121 to 122°C (recystallised from chlorobutane).

EXAMPLE 17

40 g (0.087 mol) of 4,4'-dihydroxy octachlorodiphenyl were hydrogenated in a solution of 29 g (0.35 mol) of NaHCO₃ and 300 ml of water for a period of 40 minutes at 270°C/150 atms. hydrogen pressure using the CoS/FeS catalyst of Example 4. Working up was carried out in the same way as described in Example 6. The residue was recrystallised from diisopropylether, giving 18.6 g of pure 4,4'-dihydroxy-2,6,2', 6'-tetrachlorodiphenyl (65 % of the theoretical yield). Melting point 186° to 187°C.

EXAMPLE 18

60 g of 2,4-bis-(dimethylaminomethyl)-3,6-dichlorophenol, 10 g of a CoS catalyst according to Example 1 and 350 ml of toluene were introduced into a 0.7 litre capacity hydrogenation autoclave (equipped with a stirring mechanism). The autoclave was closed, the air present in it displaced with nitrogen and the nitrogen subsequently flushed out with hydrogen. Thereafter the contents of the autoclave were heated to 200°C and hydrogenated for 60 minutes under a hydrogen pressure of 200 atms. On completion of hydrogenation, the catalyst was filtered off under suction, the toluene solution washed with approximately 300 ml of 2 N HCl and subsequently dried with Na₂SO₄. The solvent was run off and the residue distilled, giving 25 g of a crude product of which 84 % consisted of 2,4-dimethyl-3-chlorophenol, corresponding to a yield of 68 % of the theoretical yield. Melting point: 67° to 68°C (recrystallised from petroleum ether).

EXAMPLE 19

41 g of 2,2'-dihydroxy-3,5,6,3',5', 6'-hexachlorodiphenyl methane (hexachlorophene), 33 g of pyridine, 13 g of the CoS catalyst according to Example 1 and 300 ml of toluene were introduced into a 0.7 litre capacity hydrogenation autoclave. The autoclave was closed, the air present in its displaced with nitrogen and the nitrogen subsequently flushed out with hydrogen. The contents of the autoclave were then heated to 280°C and hydrogenated for 60 minutes at 280°C under a hydrogen pressure of 300 atms. On completion of hydrogenation, the catalyst was filtered off under suction, the toluene solution washed with approximately 300 ml of 2 N HCl and subsequently dried with Na₂SO₄. The solvent was distilled off, giving 24 g of a crude product of which 82.17 % consisted of 2,2'-dihydroxy-6,6'-dichlorodiphenyl methane, corresponding to a yield of 73 % of the theoretical yield. Melting point 176° to 178°C (recrystallised from toluene).

EXAMPLE 20

Following the procedure of Example 6, 41 g of 2,5-dichloro-4-methylmercaptophenol, 18 g of NaHCO₃, 10 g of a CoS catalyst according to Example 1 and 240 ml of water were hydrogenated for 60 minutes at 200°C under a hydrogen pressure of 200 atms. Working up was carried out in the same way as described in Example 6, giving 26.5 g of a crude product of which 71.3 % consisted of 3-chloro-4-methylmercaptophenol, corresponding to a yield of 54 % of the theoretical yield. Melting point: 59° to 60°C (recrystallised from cyclohexane).

EXAMPLE 21

Following the procedure of Example 19, 22.5 g of 5,-6,8-trichloro-1,3-benzodioxane, 15 g of pyridine, 10 g of a CoS catalyst according to Example 1 and 200 ml of toluene were hydrogenated for 60 minutes at 280°C under a hydrogen pressure of 200 atms. Working up was carried out as described in Example 19, giving 8.4 g of a crude product of which 82.9 % consisted of 3-chloro-o-cresol, corresponding to a yield of 53 % of the theoretical yield. Melting point: 84°C (recrystallised from ligroin).

EXAMPLE 22

Following the procedure of Example 6, 34.2 g of 4,5-dichloro-2-phenoxyphenol, 10 g of NaHCO₃, 10 g of a CoS catalyst according to Example 1 and 300 ml of water were hydrogenated for 90 minutes at 250°C under a hydrogen pressure of 200 atms. Working up was carried out in the same way as described in Example 6, giving 24.5 g of a crude product of which 65 % consisted of 5-chloro-2-phenoxy phenol boiling at 130° to 133°C/1 Torr, and 18 % of unreacted 4,5-dichloro-2-phenoxyphenol. Accordingly, the yield comprised 63.5 and 54 % of the theoretical, based on the starting material reacted and used, respectively.

What is claimed is:

1. Process for preparing 3-halogen- and 3,5-dihalogen-phenols by the dehalogenation of higher halogenated phenols which comprises reacting a halogen compound having the formula

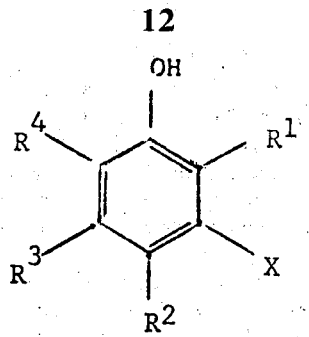

wherein
X is halogen
R¹, R², R³ and R⁴ independently of one another are selected from the group of hydrogen, halogen, alkyl having up to 12 carbon atoms, benzyl, phenyl, benzyl and phenyl substituted by hydroxy, halogen, and/or linear or branched alkyl having up to 12 carbon atoms, alkoxy having up to 12 carbon atoms, phenoxy alkyl mercapto having up to 12 carbon atoms and dialkylaminomethyl wherein the alkyl groups contain up to 12 carbon atoms, with the proviso that at least one of R¹, R² or R⁴ is halogen and when 3,5-dihalogenphenols are prepared, R³ is halogen, with hydrogen at a temperature of from 100° to 350°C under a hydrogen pressure of from 20–250 atm in the presence of 0.5 to 20% by weight of a catalyst consisting essentially of a sulfide or polysulfide of Fe, Co, or Ni or mixtures of these metal sulfides or polysulfides.

2. Process of claim 1 wherein the catalyst is the sulphide of one or more of the metals Fe, Co and Ni.

3. Process of claim 1 wherein the catalyst is the polysulphide of one or more of the metals Fe, Co and Ni.

4. Process of claim 1 wherein the catalyst is a mixture of sulphides and polysulphides of one or more of the metals Fe, Co and Ni.

5. Process of claim 1 wherein the catalyst is supported on a carrier.

6. Process of claim 1 wherein the reaction is carried out at a temperature of from 180°–330°C.

7. Process of claim 1 wherein the reaction is carried out under a hydrogen pressure of from 50–200 atms.

8. Process of claim 1 wherein the reaction is carried out in inert solvent solution.

9. Process of claim 1 wherein 4,4'-dihydroxy octachlorodiphenyl is used as starting material for the production of 4,4'-dihydroxy-2,6,2', 6'-tetrachloro diphenyl.

* * * * *